United States Patent
Luo et al.

(10) Patent No.: US 11,407,673 B2
(45) Date of Patent: Aug. 9, 2022

(54) HIGH INDEX GLASSES

(71) Applicant: CORNING INCORPORATED, Corning, NY (US)

(72) Inventors: Jian Luo, Painted Post, NY (US); Alexander I Priven, Sejong-si (KR)

(73) Assignee: Corning Incorporated, Corning, NY (US)

( * ) Notice: Subject to any disclaimer, the term of this patent is extended or adjusted under 35 U.S.C. 154(b) by 315 days.

(21) Appl. No.: 16/682,482

(22) Filed: Nov. 13, 2019

(65) Prior Publication Data
US 2020/0172426 A1    Jun. 4, 2020

Related U.S. Application Data

(60) Provisional application No. 62/773,751, filed on Nov. 30, 2018.

(51) Int. Cl.
*C03C 3/062* (2006.01)

(52) U.S. Cl.
CPC .......... *C03C 3/062* (2013.01); *C03C 2201/32* (2013.01); *C03C 2201/42* (2013.01)

(58) Field of Classification Search
CPC ......... C03C 3/062; C03C 3/078; C03C 3/085; C03C 3/095
See application file for complete search history.

(56) References Cited

U.S. PATENT DOCUMENTS 3,804,646 A    4/1974   Dumbaugh
6,465,105 B1   10/2002  Johnson et al.
(Continued)

FOREIGN PATENT DOCUMENTS

CN    1903761 A       1/2007
DE    102009011507 A1 9/2010
(Continued)

OTHER PUBLICATIONS

International Search Report and Written Opinion of the European International Searching Authority; PCT/US2019/061700; dated Feb. 28, 20; 10 Pgs.

*Primary Examiner* — Noah S Wiese
(74) *Attorney, Agent, or Firm* — Smit Kapadia; Svetlana Z. Short

(57) ABSTRACT

A glass composition comprising: $Al_2O_3$, ZnO, and $SiO_2$; $TiO_2$, in the amount of at least 10 mol % and not greater than 20 mol %; and alkaline metal oxide selected from the group consisting of MgO, CaO, SrO, BaO, or any combination thereof,
such that the molar sum of MgO, CaO, SrO, BaO, and ZnO, in the amount in the glass composition is least 20 mol % and not greater than 35 mol %, and such that:
the amount of BaO is 0 to 10 mol %; the amount of MgO is 0 to 10 mol %
the amount of CaO is 0 to 10 mol %, and the molar sum of CaO and MgO in the glass composition is less than 12.5 mol %; and
rare earth metal oxides ($\Sigma RE_mO_n$), in the amount of at least 1.5 mol % and not greater than 10 mol %; alkali metal oxides ($\Sigma Alk_2O$), in the amount of greater than or equal to 0 mol % and less than or equal to 5 mol %; and not greater than 5 mol % of other components; and wherein $-5$ mol %$\leq Al_2O_3$ (mol %)$-1.5\ \Sigma RE_mO_n$ (mol %)$-\Sigma Alk_2O$ (mol %)$\leq +5$ mol %.

28 Claims, 3 Drawing Sheets

(56) References Cited

U.S. PATENT DOCUMENTS

| | | | |
|---|---|---|---|
| 7,326,666 B2 | 2/2008 | Yamamoto et al. | |
| 8,034,733 B2 | 10/2011 | Kobayashi et al. | |
| 8,691,712 B2 | 4/2014 | Suzuki et al. | |
| 9,701,568 B2* | 7/2017 | Mennemann | C03C 3/089 |
| 9,790,123 B2 | 10/2017 | Maeda et al. | |
| 2013/0011607 A1* | 1/2013 | Mushiake | C03C 3/078 |
| | | | 428/141 |
| 2014/0193643 A1 | 7/2014 | Akhtar et al. | |
| 2015/0158755 A1 | 6/2015 | Wang et al. | |
| 2018/0141851 A1* | 5/2018 | Amma | C03C 3/097 |

FOREIGN PATENT DOCUMENTS

| | | | | |
|---|---|---|---|---|
| GB | 1319653 A | | 6/1973 | |
| JP | 50073914 A | * | 6/1975 | C03C 3/072 |
| JP | 50073914 A | | 6/1975 | |
| JP | 2000159539 A | | 6/2000 | |
| JP | 2001076336 A | | 3/2001 | |
| JP | 2001134925 A | | 5/2001 | |
| JP | 2004-182598 A | | 7/2004 | |
| JP | 2004244226 A | | 9/2004 | |
| JP | 6210940 B2 | | 10/2017 | |
| WO | 2015/046195 A1 | | 4/2015 | |

\* cited by examiner

HIGH INDEX GLASSES

CROSS-REFERENCE TO RELATED APPLICATION

This application claims the benefit of priority under 35 U.S.C § 119 of U.S. Provisional Application Ser. No. 62/773,751 filed on Nov. 30, 2018, the content of which is relied upon and incorporated herein by reference in its entirety

BACKGROUND

Field

The present specification generally relates to glass compositions suitable for use in optical displays, such as, for example, displays for augmented reality devices or virtual reality devices, optical fibers, and optical lenses. More specifically, the present specification is directed to high index glasses that may be used in displays for augmented reality devices or virtual reality devices.

Technical Background

In the recent decade, the demand for optical glasses with high refractive index (i.e., $n_d > 1.60$) has increased with the growing market in augmented reality and virtual reality devices. Other requirements for the optical glasses used in augmented reality or virtual reality devices are good transmittance in the visible range, good glass formability, chemical durability, and relatively low production cost. The manufacturing of glasses with high refractive index is quite different from the production of display glasses that do not require such a high refractive index. Accordingly, the demands of high refractive index optical glasses are not the same as the demands of display glasses, and different glass compositions may be required for 1 high refractive index optical glasses than for display glasses.

Another requirement of optical glasses for use in augmented reality or virtual reality devices is low glass density. Since many augmented reality or virtual reality devices are made as wearable devices, the weight of the device is held by a user. Over an extended period of time, even a relatively light weight device can become cumbersome to wear. Thus, light, low-density glasses (i.e., density less than or equal to 4.00 g/cm$^3$) are desirable for use in augmented reality or virtual reality devices.

In order to reduce the cost of production, it would be preferable that the high index glasses have good chemical and physical properties and have viscosity characteristics compatible with conventional manufacturing equipment. However, it is difficult to create a high index glass with a combination of the desirable chemical and physical properties. For example, attempts to increase the refractive index of the glass have often caused undesirable increases in glass density that made the glass articles heavier. Attempts to reduce the melting temperature by reducing the high-temperature viscosity resulted in devitrification of the glass melt when forming glass articles, which was caused by high liquidus temperature. Attempts to decrease the glass transition temperature caused undesirable increases in the coefficient of thermal expansion, and attempts to increase the elastic modulus to above 95 GPa caused undesirable raising of the glass transition temperature.

It is noted that some silica-free phosphate glasses may have high refractive indexes and low CTE. These are not silicate type glasses. U.S. Pat. No. 8,691,712, discloses borate glasses having $n_d > 1.75$ and $\alpha < 60 \times 10^{-7}$ K$^{-1}$ that comprises less than 12% silica and greater than 12% B$_2$O$_3$. However, both borate and phosphate glasses are known to have low elastic moduli, i.e. they are not rigid enough for many applications. Also, most borate and phosphate (non-silicate) glasses comprise high amounts of harmful and/or expensive and/or heavy oxides, such as PbO, Sb$_2$O$_3$, Ta$_2$O$_5$, Gd$_2$O$_3$, Bi$_2$O$_3$, etc., which are undesirable in mass-production. Accordingly, a need exists for silicate high index glasses that have the above-mentioned attributes, preferably have an elastic modulus above 95 GPa, and are suitable for use in an augmented reality or virtual reality device, or for other optical components.

SUMMARY

Figure 1:
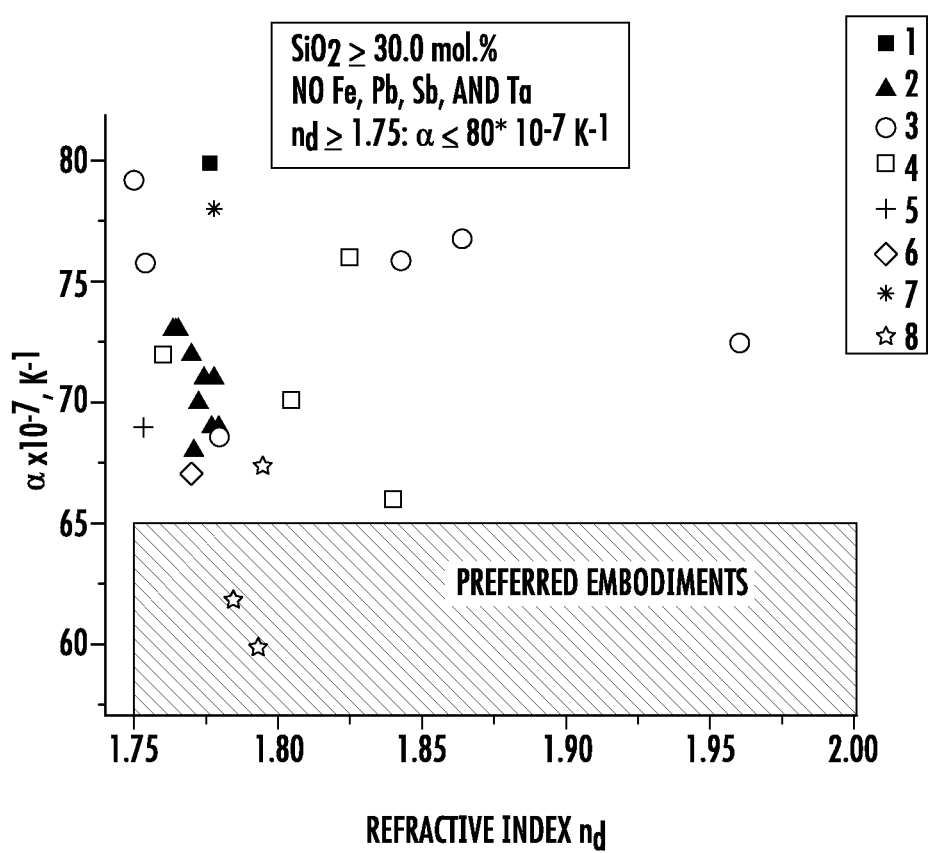
FIG. 1 illustrates a linear thermal expansion coefficient ($\alpha$) vs. refractive index (Nd) for several high index glasses comprising at least 30 mol % SiO$_2$.

According to some embodiments, a glass composition comprises:
(a) Al$_2$O$_3$, ZnO, and SiO$_2$;
(b) TiO$_2$, in the amount of at least 10 mol % and not greater than 20 mol %;
(c) alkaline metal oxide selected from the group consisting of MgO, CaO, SrO, BaO, or any combination thereof,
such that the molar sum of MgO, CaO, SrO, BaO, and ZnO, in the amount in the glass composition is least 20 mol % and not greater than 35 mol %, and such that:
(i) the amount of BaO is 0 to 10 mol %;
(ii) the amount of MgO is 0 to 10 mol %;
(iii) the amount of CaO is 0 to 10 mol %, and the molar sum of CaO and MgO in the glass composition is less than 12.5 mol %;
(d) rare earth metal oxides ($\Sigma RE_mO_n$), in the amount of at least 1.5 mol % and not greater than 10 mol %;
(e) alkali metal oxides ($\Sigma Alk_2O$), in the amount of greater than or equal to 0 mol % and less than or equal to 5 mol %; and
(f) not greater than 5 mol % of other components; and wherein
$-5$ mol % $\leq$ Al$_2$O$_3$ (mol %)$-1.5$ $\Sigma RE_mO_n$ (mol %)$-\Sigma Alk_2O$ (mol %)$\leq +5$ mol %.

According to some embodiments:
$-3$ mol % $\leq$ Al$_2$O$_3$ (mol %)$-1.5$ $\Sigma RE_mO_n$ (mol %)$-\Sigma Alk_2O$ (mol %)$\leq +3$ mol %.

According to some embodiments, the glass composition comprises from 30 mol % to 45 mol % SiO$_2$, and according to some embodiments from 30 to 35 mol % SiO$_2$.

According to some embodiments, the glass composition comprises from 15 mol % to 20 mol % ZnO.

According to some embodiments, the glass composition comprises less than or equal to 15 mol % Al$_2$O$_3$. According to some embodiments, the glass composition comprises from 3 mol % to 15 mol % Al$_2$O$_3$, and according to some embodiments from 10 to 15 mol % $Al_2O_3$. According to some embodiments, the glass composition comprises greater than or equal to 15 mol % ZnO.

According to some embodiments, the glass has a refractive index $n_d$ (refractive index measured at 589.3 nm) of greater than or equal to 1.66 and less than or equal to about 1.83, and a density d of less than or equal to 3.9 g/cm$^3$.

According to some embodiments, the glass composition has a melting temperature $T_m$ that is less than or equal to 1410° C. According to some embodiments, the glass composition has a glass transition temperature $T_g$ that is greater than or equal to than about 600° C. and less than or equal to about 700° C. According to some embodiments. the glass composition has a crystallization onset temperature $T_x$, such that the difference $(T_x-T_g)$ is greater than or equal to about 130° C.

According to some embodiments wherein the glass composition has a linear thermal expansion coefficient in the range 20-100° C., $\alpha_{20-100}$ of greater than or equal to about $50\times10^{-7}$ K$^{-1}$ and less than or equal to about $60\times10^{-7}$ K$^{-1}$.

According to some embodiments, the glass composition has a linear thermal expansion coefficient in the range 20-300° C., $\alpha_{20-300}$, of less than or equal to $65\times10^{-7}$ K$^{-1}$, and in some embodiments less than or equal to $60\times10^{-7}$ K$^{-1}$.

According to some embodiments the glass composition comprises:
(a) greater than or equal to 30.0 mol % and less than or equal to 35.0 mol % $SiO_2$;
(b) greater than or equal to 12.0 mol % and less than or equal to 20.0 mol % $TiO_2$;
(c) greater than or equal to 10.0 mol % and less than or equal to 15.0 mol % $Al_2O_3$;
(d) greater than or equal to 5.0 mol % and less than or equal to 10.0 mol % of earth metal oxides;
(e) greater than or equal to 15.0 mol % and less than or equal to 20.0 mol % ZnO; and
(f) greater than or equal to 5.0 mol % and less than or equal to 15.0 mol % alkaline earth metal oxides (MgO+CaO+SrO+BaO).

According to some embodiments the glass composition comprises $La_2O_3$.

According to some embodiments, $n_d$ is 1.78 to 1.83; and density d is 3.7 g/cm$^3$-3.9 g/cm$^3$. According to some embodiments the glass exhibits the ratio $(n_d-1)/d$ of greater than or equal to about 0.20 cm$^3$/g.

According to some embodiments the glass has Young's modulus of about 95-120 GPa, and linear coefficient of thermal expansion (CTE) of about $60\times10^{-7}$ K$^{-1}$ to $80\times10^{-7}$ K$^{-1}$, within the 20° C. to 300° C. temperature range. According to some embodiments, the glass has Young's modulus of about 105-120 GPa and linear coefficient of thermal expansion $\alpha$ of about $60\times10^{-7}$ K$^{-1}$ to $-80\times10^{-7}$ K$^{-1}$, within the 20° C. to 300° C. temperature range.

According to some embodiments the glass has glass transition temperature $T_g$ of about 600° C. to about 700° C.; specific modulus of between 25 and 35 GPa*cm$^3$/gram (e.g., 28-32 GPa*cm$^3$/gram, or 29 to 31 GPa*cm$^3$/gram, or about 30 GPa*cm$^3$/gram); melting temperature not greater than 1450° C. and liquidus temperature that is smaller than the melting temperature. According to some embodiments the liquidus temperature is 1300° C., 1325° C. 1350° C., 1375° C., 1400° C., 1410° C., or 1415° C.

According to some embodiments the glass has a refractive index, measured at 589.3 nm, greater than or equal to 1.66, for example between 1.66 and 1.83, or 1.78 and 1.83.

According to some embodiments the glass has a density from-greater than or equal to 3.2 g/cm$^3$ and less than or equal to 3.9 g/cm$^3$.

According to some embodiments the glass has a liquidus temperature of about 1410° C.

According to some embodiments glass has a glass annealing temperature from greater than or equal to 600° C. and less than or equal to 700° C.

According to some embodiments glass has a crystallization onset temperature $T_x$ such as the difference $(T_x-T_g)$ is greater than or equal to 130° C., or greater than or equal to 160° C.

According to some embodiments, glass may additionally comprise—the refractive index raising components (i.e., constituents) that are selected from a group consisting of: BaO, $Nb_2O_5$, $MoO_3$, and $CeO_2$.

According to some embodiments a zinc aluminosilicate glass comprises:
(a) greater than or equal to 10 weight % and less than or equal to 20 weight % $TiO_2$;
(b) greater than or equal to 20 weight % and less than or equal to 35 weight % (MgO+CaO+SrO+BaO+ZnO), including
  a. from 0 to 5 weight % MgO,
  b. from 0 to 5 weight % CaO,
  c. from 0 to 10 weight % BaO,
  d. sum of (CaO+MgO) being less than 10 weight %;
(c) greater than or equal to 8 weight % and less than or equal to 25 weight % rare earth metal oxides ($\Sigma RE_mO_n$);
(d) greater than or equal to 0 weight % and less than or equal to 5 weight % alkali metal oxides ($\Sigma Alk_2O$); and
(e) not more than 5 weight % of other species.

According to some embodiments the glass has the refractive index $n_d$ about 1.78-1.83; density less than or equal to about 3.9 g/cm$^3$; glass transition temperature $T_g$ of 600° C. to 700° C.; specific modulus of about 30-34 GPa*cm$^3$/gram; and liquidus temperature of less than or equal to 1410° C., and crystallization onset temperature $T_x$ greater than or equal to $(T_g+130)$° C.

According to some embodiment a glass article comprises a zinc aluminosilicate glass, the glass comprising, on mole percent basis:
greater than or equal to 10 mol % and less than or equal to 20 mol % $TiO_2$;
greater than or equal to 20 mol % and less than or equal to 35 mol %;
(MgO+CaO+SrO+BaO+ZnO), including from 0 to 10 mol % MgO, from 0 to 10 mol % CaO, from 0 to 10 mol % BaO, sum of (CaO+MgO) being less than 12.5 mol %;
greater than or equal to 1.5 mol % and less than or equal to 10 mol % rare earth metal oxides ($\Sigma RE_mO_n$);
greater than or equal to 0 mol % and less than or equal to 5 mol % alkali metal oxides ($\Sigma Alk_2O$); and
not more than 5 mol % of other compatible species,
wherein the following is satisfied: $-5$ mol %$\leq (Al_2O_3[\text{mol \%}]-1.5\ \Sigma RE_mO_n\ [\text{mol \%}]-\Sigma Alk_2O\ [\text{mol \%}])\leq +5$ mol %.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the embodiments described herein, and together with the description serve to explain the design and advantages of the claimed subject matter.

DETAILED DESCRIPTION

Definitions

The term "annealing point," as used herein, refers to the temperature determined according to ASTM C598-93 (2013). For typical glass compositions, the annealing point is the temperature at which the viscosity of a glass of a given glass composition is approximately $10^{13.2}$ poise.

The term "liquidus temperature" refers to the temperature above which the glass composition is completely liquid with no crystallization of constituent components of the glass. This property is measured by the gradient method according to ASTM C829-81 Standard Practices for Measurement of Liquidus Temperature of Glass.

The term "liquidus viscosity" refers to the viscosity of the glass composition at the liquidus temperature of the glass composition.

The term "$\alpha$," as used herein, refers to the mean linear coefficient of thermal expansion (also referred to as mean coefficient of linear thermal expansion) of the glass composition over a temperature range from 20° C. (room temperature (RT)) to 300° C. This property is measured by using a horizontal dilatometer (push-rod dilatometer) in accordance with ASTM E228-11. (I.e, unless specified otherwise $\alpha = \alpha_{20-300}$, linear coefficient of thermal expansion in the temperature range of 20-300° C.) The numeric measure of $\alpha$ is expressed as $$\alpha = \frac{\Delta L}{L_0 \Delta T},$$

where $L_0$ is the linear size of a sample at some temperature within or near the measured range, and $\Delta L$ is the change in the linear size L in the measured temperature range $\Delta T$. The linear thermal expansion coefficient for the temperature range of range 20° C.-100° C. is denoted as $\alpha_{20-100}$.

The term "refractive index", or $n_d$, refers to the refractive index of a glass composition for the yellow d-line of sodium at about 589.3 nm, measured at room temperature, RT.

Unless specified otherwise, for the glass embodiments disclosed in herein, the refractive index was measured by using the Becke line method.

The density of the glass embodiments when measured, was measured at room temperature using Archimedes' Principle according to ASTM C693.

The elastic moduli are measured by using Resonant Ultrasound Spectroscopy, using a Quasar RUSpec 4000 available from ITW Indiana Private Limited, Magnaflux Division.

The glass transition temperature ($T_g$) is measured by differential scanning calorimeter (DSC) at the heating rate of 10° K/min, after the glass was cooled in air to RT.

The exemplary embodiments of the glass(es) according to the embodiments of the glass compositions described herein advantageously have high refractive index, $n_d$, low linear thermal expansion coefficient $\alpha$ at temperatures that are below the glass transition temperature $T_g$, as well as high elastic modulus E, and high specific modulus (E/d). Such glasses can be utilized in multiple optical systems, for example as consumer glasses, camera lenses, etc., as well as substrates for information recording media. In addition, the exemplary glass embodiments are light weight, and advantageously exhibit high rigidity (low deformation under external force). Other advantages of these glasses are comparably low melting temperature and, moderate glass transition temperature Tg (e.g., from 600° C. to 700° C.). In some embodiments the glass has a relatively high elastic modulus (E≥100 GPa), which is advantageous in media recording applications. In some embodiments the glass has elastic modulus E greater 95 GPa and less than 125 GPa. And in some embodiments, glass elastic modulus E is between 98 GPa and 120 GPa.

According to exemplary embodiments, the glasses have glass transition temperatures ($T_g$) around 600° C. making a glass compatible with conventional equipment for forming the articles; low thermal expansion to limit warping of the glass during formation—for example linear coefficient of thermal expansion $\alpha$ between $50\times10^{-7}$ K$^{-1}$ and $10\times10^{-7}$ K$^{-1}$, preferably $\alpha<80\times10^{-7}$ K$^{-1}$ or even $\alpha<65\times10^{-7}$ K$^{-1}$, and making the glass compatible with other materials like steels or alloys; low enough melting temperature of not greater than 1450 C, preferably not greater than 1400° C. (e.g. 1100° C. to 14000° C., or 1200° C. to 1400° C. melting temperature) making the glass melting process less energy-consuming and compatible with conventional refractories; and ability not to form high stresses in the articles when cooling after being formed. The last quantity mainly depends on the coefficients of thermal expansion below and above $T_g$, Young's modulus and Poisson's ratio. For example, in some embodiments the linear coefficient of thermal expansion $\alpha$ is less than $100\times10^{-7}$ K$^{-1}$, or $60-70\times10^{-7}$ K$^{-1}$ or less for information recording media).

The glass embodiments described herein provide one or more of the following advantages:

($\alpha$) a high refractive index $n_d$ of ≥1.65 (e.g., $N_d$ of 1.66; 1.75; 1.78; 1.80; 1.81; 1.83; for example, 1.67≤$N_d$≤1.83), while having low density d (e.g., d<3.9 g/cm³; or d≤3.5 g/cm³; or d≤3.3 g/cm³; or d≤3.2 g/cm³, and therebetween;

(b) a relatively low melting temperature (1300° C.-1500° C.) which results in lower energy consumption while making glass; while having relatively low liquidus temperature $T_L$<1500° C., or (e.g., $T_L$<1450° C., $T_L$≤1410° C.;) thus avoiding or minimizing crystallization of glass melt when forming articles;

(c) a relatively low glass transition temperature Tg (e.g., Tg≤700° C., or Tg≤650° C., or Tg≤625° C., or Tg≤600° C., or therebetween, while having a relatively low coefficient of thermal expansion (i.e., relatively low $\alpha$ value) between the temperatures of 20° C. and 300° C. (e.g., $\alpha$≤90×10$^{-7}$ K$^{-1}$, $\alpha$≤80×10$^{-7}$ K$^{-1}$; $\alpha$≤70×10$^{-7}$ K$^{-1}$; $\alpha$≤65×10$^{-7}$ K$^{-1}$; $\alpha$≤60×10$^{-7}$ K$^{-1}$; which advantageously minimizes stresses and warping when cooling the glass articles after being formed; and/or (d) high refractive index ($n_d$>1.75; or $n_d$>1.78, or $n_d$>1.81) while having low linear thermal expansion coefficient ($\alpha$<80×10$^{-7}$ K$^{-1}$, or $\alpha$<70×10$^{-7}$ K$^{-1}$, or $\alpha$<60×10$^{-7}$ K$^{-1}$).

For example, in some embodiments the glass density d is 3.2 g/cm³≤d≤3.9 g/cm³; or 3.5 g/cm³≤d≤3.95 g/cm³. In some embodiments the glass transition temperature is 575° C.≤Tg≤700° C.; or 600° C.≤Tg≤700° C. In some embodiments the glass density d is 3.2 g/cm³≤d≤3.9 g/cm³ (e.g., 3.5 g/cm$^3$≤d≤3.95 g/cm$^3$) and the glass transition temperature is 575° C.≤Tg≤700° C.; (e.g., 600° C.≤Tg≤700° C. In some embodiments, 55×10$^{-7}$ K$^{-1}$≤α≤90×10$^{-7}$ K$^{-1}$; or 55×10$^{-7}$ K$^{-1}$≤α≤80$^{-7}$ K$^{-1}$; or 55×10$^{-7}$ K$^{-1}$≤α≤65$^{-7}$ K$^{-1}$; or 55×10$^{-7}$ K$^{-1}$≤α≤60×10$^{-7}$ K$^{-1}$. In some embodiments, $n_d$>1.75 and α<80×10$^{-7}$ K$^{-1}$. In some embodiments $n_d$>1.78 and α<70× 10$^{-7}$ K$^{-1}$, and in some embodiments $n_d$>1.79 and α<60× 10$^{-7}$ K$^{-1}$.

In at least some embodiments the elastic modulus is above 100 GPa, or above 110 GPa, or even above 115 GPa. This high value prevents the glass articles and the devices comprising these articles, such as lenses, displays or information storage media, from deformation under loading.

High elastic modulus E together with relatively low density d helps to enable high resistance of the light-weight glass articles to external mechanical forces, which is especially important for information recording media. The mentioned property can be quantitatively described by using such a characteristic as specific modulus (E/d), which has high value, for example 30 GPa·cm$^3$/gram.

High elastic modulus is also advantageous for the glasses utilized in virtual reality or augmented reality systems, because high elastic modulus of the glass helps to prevent (or minimizes) deformation of the elements of the electric circuit that creates the image in these systems.

At the same time, however, it is known that high elastic modulus E in the glass may cause high thermal stresses within the glass when it is being cooled during the manufacturing process. High stresses within the glass are undesirable when the glass is used in optical or in consumer applications (such as the devices for virtual reality or augmented reality, or high-index lenses).

The likelihood of occurrence of high thermal stresses in optical articles can be evaluated using a ratio E·α/(1−ν), where E represents Young's modulus, where a is the mean coefficient of linear thermal expansion and ν is Poisson's ratio. Accordingly, the lower the ratio E·α/(1−ν), the less the amount of stress. Thus, it is preferable that the glass embodiments described herein have the ratio E·α/(1−ν) of about 1.0 MPa·K$^{-1}$ or less.

In order to maintain the ratio E·α/(1−ν) at the desired low enough level (≤1.0 MPa·K$^{-1}$ or less) while simultaneously having a high elastic modulus E, the glass should have low value of CTE (i.e., low α). However, it was known that it is difficult or impossible to make a glass with high refractive index $n_d$ and low CTE (low α), especially if a glass comprises some significant amount of silica (e.g. greater than or equal to 30 mol % SiO$_2$) and does not have large amounts of ecologically harmful (undesirable) species, such as lead, antimony or tantalum.

Without these undesirable species, it was only possible to have glass compositions that have either not a very high refractive index ($n_d$<1.75), or that have high CTE (high α, where α>65×10$^{-7}$ K$^{-1}$ in the temperature range of 20–300° C.). This is illustrated in FIG. 1 which shows available data for these two properties for comparative glasses (marked as glasses 1-7 in FIG. 1) that comprise greater than or equal to 30.0 mol % SiO$_2$ and that are essentially free of such undesirable elements as Fe (colorant), Pb, Sb and Ta. The comparative glasses shown in FIG. 1 have refractive index $n_d$>1.75, but also have α values between about 67×10$^{-7}$ K$^{-1}$ and 80×10$^{-7}$ K$^{-1}$, in the temperature range of 20° C.-300° C. FIG. 1 also illustrates measured data for some of the glass embodiments described herein (marked by a star symbol and as glass 8, see for example the gray colored area of FIG. 1). All glasses depicted in FIG. 1 have $n_d$≥1.75 and α≤80×10$^{-7}$ K$^{-1}$.

As it is shown in FIG. 1, the exemplary embodiments of the glass compositions disclosed herein exhibit low CTE values (α<70×10$^{-7}$ K$^{-1}$, more preferably α<68×10$^{-7}$ K$^{-1}$, preferably α<65×10$^{-7}$ K$^{-1}$, or even α<60×10$^{-7}$ K$^{-1}$) while having high refractive indices $n_d$, exceeding 1.75 or even 1.79. At least some exemplary embodiments of the glass compositions disclosed herein exhibit low CTE values (α<70×10$^{-7}$ K$^{-1}$, more preferably α<68×10$^{-7}$ K$^{-1}$, preferably α<$^{65}$×10$^{-7}$ K$^{-1}$, or even α<60×10$^{-7}$ K$^{-1}$) while having high refractive indices $n_d$, for example between 1.75 and 1.8.

Figure 2:
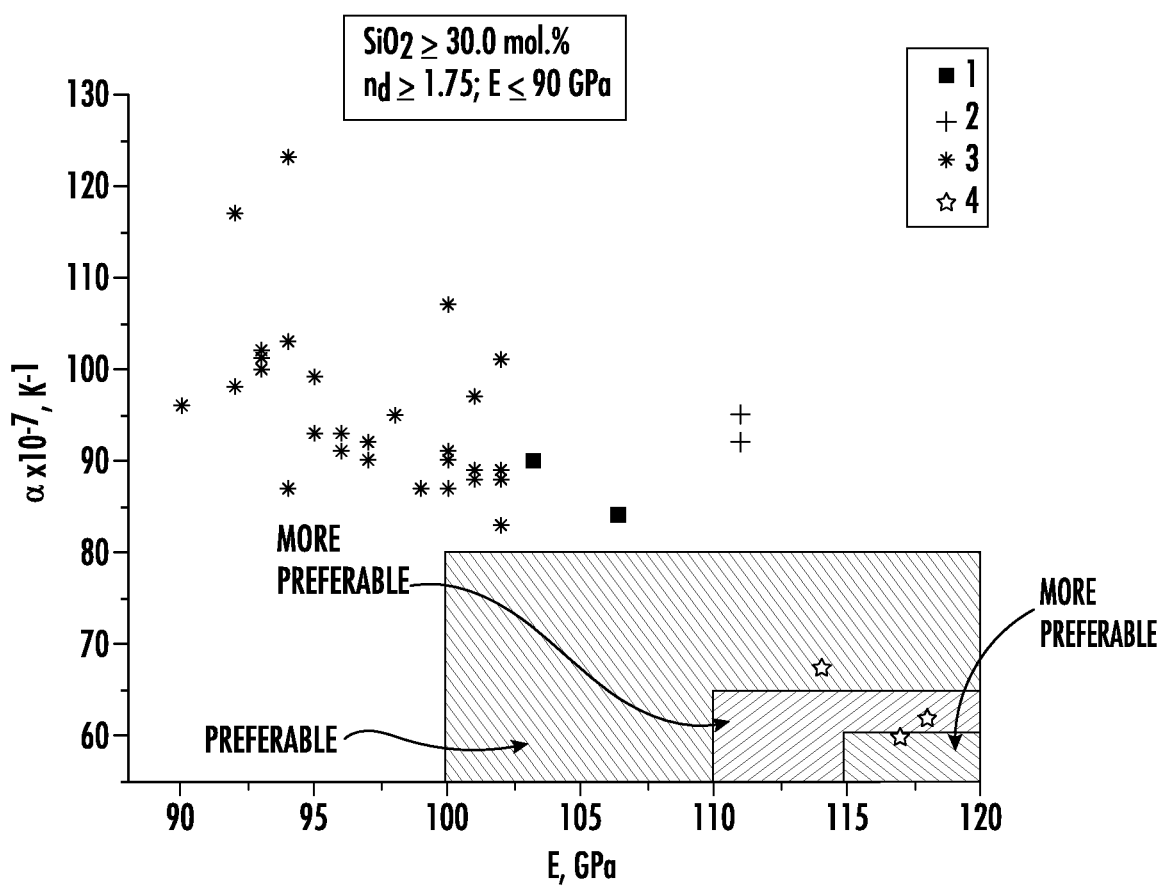
FIG. 2 illustrates a linear thermal expansion coefficient ($\alpha$) vs. Young's elastic modulus (E) for several high index glasses comprising at least 30 mol % SiO$_2$.

It is especially difficult to design a glass composition with high index and low CTE if the glass is required to have a high Young's elastic modulus. This difficulty is illustrated in FIG. 2, where we show available data for the Young's modulus and CTE values for a set of comparative silicate glasses (indicated by symbols *, +, and ■ in FIG. 2) that comprise greater than or equal to 30.0 mol % SiO$_2$ (without other compositional limitations) and that have a refractive index $n_d$>1.75 and Young's modulus E≥90 GPa. FIG. 2 also illustrates measured data for some of the manufactured high refractive index glass embodiments described herein (marked by star symbols in FIG. 2). The glass embodiments shown in FIG. 2 have $n_d$≥1.75 and α≤80×10$^{-7}$ K$^{-1}$.

As is clear from the figure, the exemplary embodiments of high-index silicate glass compositions disclosed herein exhibit low CTE values (α<80×10$^{-7}$ K$^{-1}$, α<65×10$^{-7}$ K$^{-1}$, or even α <60×10$^{-7}$ K$^{-1}$) at young's modulus E>100 GPa, or E>110 GPa, or even E>115 GPa. The unique combination of very high elastic modulus (E>115 GPa) and low CTE (α<60×10$^{-7}$ K$^{-1}$) for glasses with high refractive index ($n_d$>1.78, or even $n_d$>1.79) makes it possible to keep the high-index material very rigid and prevent high thermal stresses in it during manufacturing.

The glass embodiments shown in FIG. 2 are free of the environmentally harmful, expensive, and/or heavy species (such as the following oxides PbO, Sb$_2$O$_3$, Ta$_2$O$_5$, Gd$_2$O$_3$, Bi$_2$O$_3$, etc.) which are undesirable for use in mass-production of glass. All glass embodiments described herein comprise silica as a main network former, which makes them less expensive to manufacture.

The embodiments of the glasses described herein comprise three major constituents (also referred as components herein): silica (SiO$_2$), titania (TiO$_2$) and zinc oxide (ZnO). The glasses may also comprise alkaline earth metal oxides and rare earth metal oxides. The glasses may also optionally comprise alkali metal oxides and other compatible constituents in low concentrations (e.g., 5 mol %, or less).

The glass embodiments described herein can be utilized, for example, in at least two kinds of applications: as optical glasses with high refractive indices (below, we use the term "high-index glasses") and/or as substrates for information recording media. The high-index glasses may be used for various applications, such as displays for virtual reality and augmented reality, high-index lenses, lasers, etc.

Figure 3:
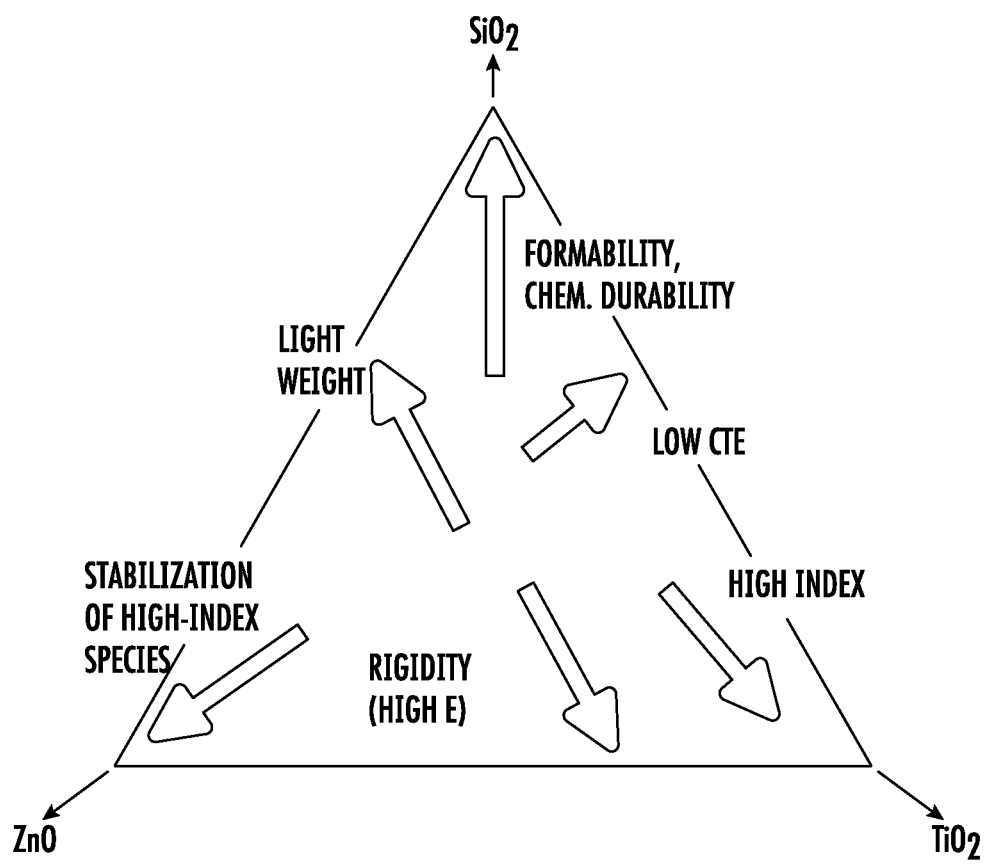
FIG. 3 is a schematic illustration of major effects of compositional changes on the glass properties of the glass embodiments disclosed herein.

FIG. 3 schematically illustrates major effects of changing the content of the amounts of above-mentioned major glass components (SiO$_2$, ZnO and TiO$_2$) on the glass properties of the embodiments described herein. It should be understood that the present disclosure is directed to glass compositions having multiple potential applications, where different attributes may be relatively more or less important, depending on the desired use or application for a particular glass. Therefore, depending on a particular use or application, different amounts of components (i.e., constituents) may be preferable for different glass embodiments described herein, in order to provide different desired glass properties for different glass applications discussed herein.

In embodiments of glass compositions described herein, the concentrations of components (e.g., $SiO_2$, ZnO, $TiO_2$, $Al_2O_3$, and the like) are given in mole percent (mol %) on an oxide basis, unless otherwise specified. Components of the glass composition according to embodiments are discussed individually below. It should be understood that any of the variously recited ranges of one component may be individually combined with any of the variously recited ranges for any other component.

As described above, the glass compositions disclosed herein comprise silica, $SiO_2$, as a glass network former. Silica increases the viscosity of glasses through the whole temperature range, increasing liquidus viscosity, which enables the glass melt to avoid crystallization at temperature ranges near the liquidus temperature. Also, adding more silica to a glass composition causes a reduction in glass density and CTE, which is desirable. However, silica significantly reduces the refractive index of glass. Adding too much silica to the glass composition also increases the melting temperature of the glass, which may not desirable. Applicants discovered that if the content of $SiO_2$ in a glass composition is less than about 30 mol %, the silica based glass is difficult to form. If the content of $SiO_2$ in a glass composition is greater than about 45 mol %, the refractive index of the glass becomes too low.

Accordingly, for the embodiments of high-index glasses disclosed herein, the content of silica in the glass composition is preferably within the range from about 30 to about 45 mol %. In some embodiments, the glasses comprise $SiO_2$ in the amount from about 30 to about 33 mol %. These embodiments have the highest refractive index and lowest CTE, but their glass forming ability is not as good as it is for glasses with higher amount of silica. In some other embodiments, the glasses comprise $SiO_2$ in the amount from about 40 to about 45 mol %; these glasses are characterized by better glass forming ability, but lower refractive index and higher CTE, which may be preferable for such applications as information storage devices. Intermediate $SiO_2$ concentration ranges, such as 33 to 40 mol %, 33 to 35 mol %, or 35 to 40 mol %, may be preferable for the applications where these properties are equally important, for example the glass composition for use in making high-index lenses. Thus, it should be understood that the content of silica can be changed within the 30-45 mol % range, depending on the preferable combination of properties, i.e. the comparative importance of the glass forming ability, refractive index and CTE, which depends on the particular application of glasses as described above.

The glass composition also comprises zinc oxide, ZnO. Zinc oxide improves mechanical characteristics of the glass and increases Young's modulus of the glass, while not significantly increasing the density of glass or CTE. Because zinc oxide increases the refractive index of the glass (relative to silica), while not appreciably increasing the density d, the addition of zinc oxide to silica results in an increase in the ratio $(n_d-1)/d$, which is advantageous in high index glasses. Also, zinc oxide can be used to stabilize the high-index species, such as $TiO_2$, $ZrO_2$, $Nb_2O_5$, etc., as far as it chemically reacts with these species and, therefore, accommodates them to the glass structure (see FIG. 3). However, if the glass includes alumina, when the content of zinc oxide becomes too high zinc oxide may react with the excess of alumina in the glass, forming a mineral gahnite ($ZnAl_2O_4$) that may precipitate from a glass melt at high temperatures. In order to neutralize this effect, it is desirable to provide additional components in the glass, such as alkali and alkaline earth metal oxides, and/or rare earth metal oxides as described below.

Accordingly, the preferable range of ZnO in the embodiments of the glass compositions is mostly governed by the amounts of other high-index species added to the glasses. For the glasses with highest refractive indexes, as well as for glasses with relatively low (but still high enough) Young's modulus, like 100 GPa or less, higher concentrations of ZnO, such as about 20 mol % or more, are preferable. In the case when the requirements to the refractive index are not as high, but high rigidity is more important, the content of ZnO may be lower, such as about 15 mol % or less. In the case when these properties are equally important, the intermediate content of ZnO, such as 15-17 mol %, or 17-18 mol %, or 18-20 mol %, may become more preferable.

As described above, the third major component of the glass embodiments is titania, $TiO_2$. Titania greatly increases refractive index in a glass and has a comparably low impact to the density. Furthermore, adding titania to a glass increases the elastic modulus and fracture toughness of the glass and reduces the CTE. Thus, the addition of titania advantageously may bring very desirable glass characteristics (see FIG. 3). However, when added to peraluminous glasses (characterized by positive values (in mol %), of the quantity $(Al_2O_3-\Sigma R_2O)$), titania may precipitate from the melt in the form of rutile or other minerals. In turn, precipitation of titania raises the liquidus temperature of the glass, which may not be desirable. In addition, in high concentrations, titania may bring some coloring to a glass, which may not be desirable for some optical glass applications. Accordingly, the content of titania in the glasses should be as high as possible (e.g., 10 to 20 mol %) to reach better properties for the refractive index, density, CTE and elastic modulus, but its maximum amount in the glass composition is also limited by the above-described negative effects, such as devitrification of the melt and/or coloring the glass.

According to some embodiments, the glass compositions comprise relatively small amounts of $TiO_2$, i.e. from about 10 to about 13 mol % $TiO_2$. These glasses do not exhibit the tendency of devitrification, but provide moderately high refractive index, higher CTE and lower Young's modulus. These glasses may be preferable, for example, for use in the lenses where the highest refractive index is not demanded.

According to some embodiments, the glass compositions comprise from about 13 to about 15 mol %, or from about 15 to about 18 mol % of $TiO_2$. These glasses provide comparably high refractive index (the higher the content of $TiO_2$, the higher is the refractive index), and do not devitrify when being fast quenched, e.g. cooled between two metal plates.

According to some other embodiments, the glass compositions comprise from about 18 to about 20 mol % $TiO_2$. These glasses exhibit very high refractive index (up to $n_d>1.81$), but may also exhibit tendency toward devitrification and coloring.

Accordingly, the preferable content of $TiO_2$ in the glass compositions may be from about 10 to about 20 mol %, with variations depending on a particular application, i.e. comparable importance of mechanical, optical and crystallization properties, such as, for example, from 10 to 12 mol %, from 12 to 14 mol %, or from 14 to 16 mol %, or from 16 to 18 mol %, or from 18 to 20 mol %.

Then, the glass composition may optionally comprise rare earth metal oxides (also referred to herein as "rare earths"). For colorless glasses, the rare earth metal oxides may include $Ce_2O_3$, $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, or combinations thereof. If no color is required or desired in the glass, then a glass composition may include lanthanum oxide ($La_2O_3$), yttrium oxide ($Y_2O_3$), gadolinium oxide ($Gd_2O_3$), ytterbium oxide ($Yb_2O_3$), lutetium oxide ($Lu_2O_3$), or combinations thereof. Furthermore, the glass composition may also contain small amounts of these rare earth metal oxides when the presence of some coloring is acceptable, such as in thin lenses for consumer glasses, or sunglasses with required optical performance. Rare earth metal oxides, when added to a glass composition, increase the refractive index of the glass, which improves optical performance of the glass. Also, rare earth metal oxides may reduce the liquidus temperature of the glass, preventing the glass melt from divertifying. The rare earth metal oxides improve mechanical properties of the glass, and provide, for example a high elastic modulus, which is one of the requirements for information recording media and is also a desirable factor for optical glasses.

However, rare earth metal oxides may also increase the glass density, which may somewhat decrease the ratio of $(n_d-1)/d$. For that reason, the use of the lightest (and the least expansive) of rare earth metal oxides, $La_2O_3$ and $Y_2O_3$, is preferable. In the case when the low glass density is relatively more important, the lighter of the rare earth metal oxides, $Y_2O_3$, may be preferable. Otherwise, it may be preferable to use $La_2O_3$ as the least expensive of rare earth metal oxides. The impacts of the other rare earth oxides on other properties disclosed herein are similar. Accordingly, other rare earth oxides may also be used in the glass compositions; however, in terms of the combination of properties described herein, they do not provide significant advantages over $La_2O_3$ and $Y_2O_3$.

In the disclosed exemplary embodiments, we used the least expensive of the rare earth metal oxides ($La_2O_3$) to demonstrate that the desired combination of multiple properties of high-index glasses can be achieved for a relatively low cost. As described above, $La_2O_3$ may be added to the optical glass composition to increase the refractive index of the optical glass. However, when too much $La_2O_3$ is added into glass composition, the density of the glass increases, and the glass melts may devitrify upon cooling.

Preferably, the total amount of rare earth metal oxides in the glass composition is 1.5 mol % to 10 mol %. For example, the addition of the rare earth metal oxides in relatively high concentrations, such as, for example, 6 mol % or more (e.g., 6 to 8 mol %, or 8 to 10 mol %) may be preferable when very high values of the refractive index together with the highest mechanical performance (such as, the highest Young's modulus) are desired. When the highest refractive index is not demanded, and/or the requirements to the mechanical performance are not as high, the rare earth metal oxides may be used in lower concentrations (such as, for example, from 4 to 6 mol %, or from 2 to 4 mol %), or even in smaller concentrations (such as 1-2 mol %), or even not used at all.

The glass compositions may comprise the alkaline earth metal oxides, for example be BeO, MgO, CaO, SrO, BaO or combinations thereof. The alkaline earth metal oxides (below, we also use the term "alkaline earths") may neutralize some excess of alumina, keeping the liquidus temperature in the acceptable range, say, not more than 1350-1450° C.

However, beryllium oxide (BeO), the lightest of alkaline earths, works less effectively and, in addition, reduces the refractive index of the glass; therefore, BeO is not a preferred component in these glasses.

Magnesia, MgO, is the lightest of the alkaline earth metal oxides (except for ecologically undesirable BeO) and makes the greatest impact in the mechanical performance, which exhibits as increasing the Young's modulus and other elastic moduli (also, it is known to increase the fracture toughness). In addition, MgO (relative to other alkaline earth metal oxides) has the lowest impact on CTE. However, it also has the lowest impact (relative to other alkaline earth metal oxides) on the refractive index of glass. Accordingly, a relatively high content of MgO, such as 6-8 mol % or even more, up to 10 mol %, may be beneficial for applications that do not require the highest values of the refractive index, but where low CTE and/or high mechanical performance are demanded. In other cases, MgO may be used in small concentrations (such as 2-4 mol %, or 4-6 mol %), or not used at all. In general, the preferable content of MgO may vary from 0 to about 10 mol %.

Calcium oxide, CaO, basically works similarly to MgO, but has a somewhat greater impact on the refractive index and CTE and a little bit lower impact on mechanical properties, such as Young's modulus. However, it works significantly better than MgO as a species that stabilizes the high-index components, such as $ZrO_2$ or $Nb_2O_5$. Also, unlike magnesia, CaO does not form very refractory minerals in the excess of alumina, which prevents the peraluminous glasses from devitrification. Accordingly, the use of CaO is preferable in the cases when light weight very high refractive index is required, but the rigidity (Young's modulus) is not required to reach the highest possible values, and/or the lowest CTE is not demanded. In these cases, the glass compositions may comprise 6-8 mol % CaO or even up to 10 mol % CaO. In the cases when the requirements to such properties as rigidity and CTE are stronger, but very high refractive index is still demanded, the content of CaO in glass compositions may be somewhat less, such as 4-6 mol %, or 2-4 mol %. Otherwise, e.g. when the mechanical performance is the most important and the highest refractive index not as much, the amount of CaO in the glass compositions may be rather small (such as 2-4 mol %), or a glass may even not comprise CaO at all. In general, the preferable content of CaO may vary from 0 to about 10 mol %.

Barium oxide, BaO, works somewhat differently from CaO and MgO. The most important thing for BaO is that it not only has the highest impact to the refractive index, but, in addition, works effectively as a species that stabilizes other high-index species, such as $TiO_2$, $ZrO_2$ etc. As a result, addition of BaO in glass, considering also the possibility of increasing the amount of other high-index species, generates the highest impact on the refractive index. However, among the above alkaline earth materials, BaO has the highest impact on CTE, lowest impact on the Young's modulus, and highest impact on density. Accordingly, addition of BaO is beneficial in the case when the highest values of the refractive index are demanded. In this case, the glass composition may comprise more than 5 mol % BaO, or even more, up to 10 mol %. However, in the case when the properties described herein are demanded in combination, the highest content of BaO is not beneficial, and the preferable values are intermediate, like 4-6 mol %. In the case when the highest refractive index is not demanded, the glass composition may comprise rather small amount of BaO, such as 1-2 mol % or 2-4 mol %, or not comprise this component at all. In general, the preferable content of BaO may vary from 0 to about 10 mol %.

Strontium oxide, SrO, works intermediately between CaO and BaO, and in the glasses considered herein, it does not bring specific advantages, comparing to CaO, BaO, or their combination. However, technologically it is beneficial to use a single component rather than the mix of two. From this viewpoint, the use of SrO may become beneficial as a replacement for a mixture (CaO+BaO) in the cases when, otherwise, CaO and BaO would be desired in the proportions close to 1:1. Also, in some compositional spaces, the use of several different alkaline earths may reduce the liquidus temperature, comparing to the use of a single species; in this case, SrO may also be useful components. In the above-mentioned cases, the preferable amount of SrO in glasses is similar to those for CaO and MgO, i.e. it may vary from 0 to about 10 mol %, depending on the property requirements.

In addition to the above components, the optical glass may include alkali metal oxides, i.e. $Li_2O$, $Na_2O$, $K_2O$, $Rb_2O$, $Cs_2O$. The alkali metal oxides may be added to modify various properties of the glass composition, such as, for example, melting temperature, viscosity, mechanical strength, chemical durability, CTE and refractive index. The alkali metal oxides (also referred to herein as "alkalis") are the very effective suppressors for precipitation of alumina in forms of mullite and/or corundum. This happens because the alkalis in the glass melt react with alumina, forming aluminosilicates that at small enough concentrations are not refractory and, correspondingly, do not precipitate from the melt, preventing formation of other alumina-containing species, such as mentioned mullite and corundum. Similarly, they work efficiently as suppressors of crystallization of other refractory species, including the high-index species, such as $TiO_2$, $ZrO_2$, $Nb_2O_5$, etc. Accordingly, the addition of alkalis to a glass composition mostly reduces the liquidus temperature, that is beneficial. However, the alkali oxides reduce both refractive index and Young's modulus, and raise the CTE, which is undesirable.

Among the alkali metal oxides, the use lithium oxide ($Li_2O$) is mostly more preferable than the use of other alkali metal oxides, because it provides less negative impact on refractive index and on Young's modulus, and does not raise the CTE that other alkali metal oxides do. However, in the cases when the highest effect on the liquidus temperature is required, the glasses may comprise $Na_2O$, $K_2O$ or other alkalis.

Thus, in order to reduce the liquidus temperature of the glass to a desirable level while minimizing the negative effects on refractive index, Young's modulus, and CTE, the alkali metal oxides may optionally be added to a glass in limited amounts (e.g., up to 5 mol %), or not added at all if the liquidus temperature is not required to be reduced. When using the greatest amounts of alkalis, such as greater than 3 mol %, the use of $Li_2O$ is beneficial, in order to minimize the negative effects on the refractive index, mechanical properties and CTE. Otherwise, other alkalis may also be used. Accordingly, the preferable content of alkali oxides in the glass compositions depends on the need to reduce the liquidus temperature and may vary between 0 and about 5 mol %, such as 0-1 mol %, or 1-2 mol %, or 2-3 mol %, or 3-4 mol %, or 4-5 mol %.

Refractive index raising components, in addition to $TiO_2$, ZnO and rare earth metal oxides discussed above, may also include $ZrO_2$, $MoO_3$, $WO_3$, etc. They may be used in small amounts, such as 0 to 5 mol %. However, it should be noted that the addition of zirconia ($ZrO_2$) to peraluminous glasses may raise the liquidus temperature up to 1400-1600° C. and even more, which may cause devitrification of the melt. Other species that raise the refractive index are either not ecological (e.g. $Ta_2O_5$, $Sb_2O_3$, etc.), or considerably more expensive than the species described above, or both. Accordingly, these species may be used in the gasses in some cases, but the use of these components may not be efficient in terms of cost-performance ratio.

Other types of components that may be utilized used in the glass compositions are finer agents. Finer agents are used to remove gas bubbles from a glass melt and make it more homogeneous. For this purpose, different species of finer agents may be used, but the most preferable among them are those that also make desirable impact in the above-described properties, most of all, the refractive index. For this purpose, the glasses may comprise such species as $CeO_2$, $SnO_2$, etc., in the amounts required for that; mostly, this is from 0 to about 1 mol %, unless a greater amount is needed for other purposes. For example, cerium oxide, $CeO_2$, as one of the rare earth metal oxides (see above), may also reduce the liquidus temperature in some glass compositions.

Also, the glass composition of the embodiments described herein may optionally comprise small amounts of other compatible species or components, such as, for example, additional network formers, e.g. boron oxide ($B_2O_3$), phosphorus oxide ($P_2O_5$), etc. In particular, $B_2O_3$ and $P_2O_5$ are known to efficiently reduce the CTE of glass and improve the glass forming ability. However, these species also reduce the refractive index and Young's modulus, which is very undesirable. Therefore, these species may be used in small amounts only in the case when there is no other way to achieve the effects that they impact. In other cases, their use is not desirable.

Finally, as stated above, the glass compositions may comprise different components in various combinations. For this reason, it is also important to understand that different components may chemically interact with each other, and these interactions, sometimes rather complicated (such as interaction of three, four or even more components together), may also affect some of the glass properties. The above-mentioned rare earth metal oxides ($RE_mO_n$) are known to react with multiple components, especially concerning the alumina ($Al_2O_3$) and alkali metal oxides ($Alk_2O$), which, in turn, also react with alumina. Therefore, there are some desirable proportions that, being satisfied, optimize the properties of glass. So, as we mentioned above, alumina, being contained in a glass composition in high concentrations, may raise the liquidus temperature of the glass and, accordingly reduce its the liquidus viscosity, which is not desirable. We also mentioned that this effect can be minimized or compensated for by adding rare earths metal oxides and/or alkali metal oxides a glass composition. However, as we found, this effect is observed when these three kinds of components, $Al_2O_3$, $RE_mO_n$ and $Alk_2O$, are taken in the proportions that satisfy the following ratio: $P=[Al_2O_3$ (mol %)$-\Sigma R_2O$ (mol %)$-1.5$ $\Sigma RE_mO_n$ (mol %)$]\approx 0$, where $\Sigma R_2O$ is the total content of alkali metal oxides and $\Sigma RE_mO_n$ is the total content of rare earth metal oxides. In practice, however, exact zero value is not required, but, rather, it is desired that the mentioned quantity would not be big, such as $-3$ mol %$\leq P \leq +3$ mol %, or $-5$ mol %$\leq P \leq +5$ mol %. In some cases, it may be possible to reach acceptable glass characteristics without satisfying these proportions; however, when $|P|\leq 5$ mol %, the glass compositions preferably have better overall combinations of properties.

As disclosed above, the density of the optical glass may, in one or more embodiments, be relatively low. In at least some embodiments, the density was measured (according to ASTM C693). The density d of the optical glass described herein is less than or equal to 4.00 g/cm$^3$, such as less than or equal to 3.9 g/cm$^3$, less than or equal to 3.5 g/cm$^3$, or less than or equal to 3.2 g/cm$^3$. In one or more embodiments, the density of the optical glass may be from greater than or equal to 3.2 g/cm$^3$ to less than or equal to 4.00 g/cm$^3$, such as from greater than or equal to 3.25 g/cm³ to 4.00 g/cm³, from greater than or equal to 3.4 g/cm³ to less than 4.00 g/cm³, or from greater than or equal to 3.5 g/cm³ to less than 4.00 g/cm³.

Liquidus temperature as used herein is measured by the gradient furnace method. This method conforms to ASTM C829-81 Standard Practices for Measurement of Liquidus Temperature of Glass.

As described herein "Young's modulus" is measured by Resonant Ultrasound Spectroscopy, using a Quasar RUSpec 4000 manufactured by Magnaflux. According to the exemplary embodiments the Young's modulus of the optical glass is greater than or equal to 100 GPa. For example, in some embodiments, the Young's modulus of the optical glass is greater than or equal to 100 GPa and less than or equal to 120.0 GPa, such as greater than or equal to 105 GPa and less than or equal to 120 GPa, greater than or equal to 85.0 GPa and less than or equal to 100.0 GPa, or greater than or equal to 90.0 GPa and less than or equal to 95.0 GPa, and all ranges and sub-ranges between the foregoing values.

The thermal stability of the optical glass composition can be determined by measuring the difference between $T_x$ and $T_g$ (i.e., $T_x$-$T_g$). The $T_x$-$T_g$ value is measured as described hereinabove. In one or more embodiments, the $T_x$-$T_g$ of the optical glass may be from greater than or equal to 100° C. to less than or equal to 250 C, such as from greater than or equal to 130° C. to less than or equal to 170° C.

In some embodiments, the coefficient of thermal expansion (α) of the glass composition may be between about 50×10⁻⁷ K⁻¹ and 65×10⁻⁷ K⁻¹ and all ranges and sub-ranges between the foregoing values. The coefficient of thermal expansion (α) is determined by using a push-rod dilatometer in accordance with ASTM E228-11.

As disclosed above, optical glasses according to embodiments disclosed and described herein may be used in augmented reality devices, virtual reality devices, or information recording media.

EXAMPLES

Embodiments will be further clarified by the following examples.

Representative glass compositions and properties are summarized in Tables 1A and 1B, respectively. Table 1B lists disclosed examples of glass compositions.

One or more of glass compositions having components listed in Tables 1A and/or 1B below were prepared by conventional glass forming methods. These glasses are made from batches (e.g., glass melts of 1000 g 100% theoretical yield; typical yields were about 900 g or 90 wt % due to, e.g., mechanical loss) of source or starting materials including for example, $B_2O_3$, $Al_2O_3$, $SiO_2$, $CO_3$, $Na_2CO_3$, $CaCO_3$, $BaCO_3$, ZnO, $ZrO_2$, $TiO_2$, $La_2O_3$, $Nb_2O_5$, $SnO_2$ and other common species that are melted in Pt crucibles at from 1350° C. to 1500° C. in air with an aluminum cover. More specifically, the constituents of the glass composition(s) were melted in platinum crucibles between 1500° C. and 1600° C. for 5 to 6 hours. The glasses were then cooled between two steel plates and obtained samples of few mm thickness annealed for 1-5 hours near the anneal temperatures given in Table 2. Multiple samples of each glass composition were prepared. Each of the glass samples were tested for the refractive index $n_d$ and density. Some of the example compositions were also tested glass transition temperature ($T_g$), coefficients of thermal expansion (α) below and above $T_g$, viscosity, Young's modulus, Poisson's ratio, and liquidus temperature.

In Table 1A, all glass components are provided in mol %. (Some of the glass compositions having constituents (also referred to as components herein) listed in Table 1A below were modeled. These are denoted by an asterisk (*). The glass properties of these compositions were modeled and are similar to those that are measured from the prepared glass samples).

Various properties of the glasses formed according to Tables 1A and 1B are provided below in Table 2.

TABLE 1A

| Compositions of exemplary glasses in mol % |
|---|

| Mole % by batch | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| SiO2 | 43.66 | 31.85 | 32.23 | 32.41 | 30.07 | 43.99 | 42.03 | 42.85 | 42.34 | 41.99 | 41.65 | 41.54 | 40.93 |
| TiO2 | 10.34 | 15.54 | 19.39 | 15.00 | 14.58 | 15.60 | 11.71 | 14.45 | 15.93 | 14.40 | 17.01 | 18.52 | 17.80 |
| Al2O3 | 4.65 | 12.65 | 10.63 | 12.22 | 12.19 | 1.00 | 0.84 | 0.93 | 0.96 | 0.91 | 0.96 | 1.00 | 0.96 |
| La2O3 | 1.85 | 5.98 | 6.82 | 5.72 | 6.32 | 1.73 | 0.35 | 0.98 | 0.75 | 0.46 | 0.39 | 0.40 | 0.00 |
| Y2O3 | 0.00 | 0.00 | 0.00 | 0.00 | 0.00 | 5.55 | 7.88 | 6.87 | 7.40 | 7.84 | 8.13 | 8.20 | 8.91 |
| CeO2 | 0.01 | 0.04 | 0.04 | 0.03 | 0.04 | 0.01 | 0.01 | 0.01 | 0.01 | 0.01 | 0.01 | 0.01 | 0.01 |
| ZnO | 19.36 | 17.34 | 19.90 | 17.82 | 17.73 | 13.49 | 10.88 | 11.39 | 9.42 | 9.39 | 7.25 | 6.21 | 5.14 |
| Li2O | 0.97 | 0.22 | 4.25 | 0.31 | 0.60 | 1.10 | 2.14 | 2.28 | 3.83 | 3.59 | 5.45 | 6.39 | 6.97 |
| Na2O | 3.38 | 0.83 | 0.07 | 0.07 | 0.08 | 0.00 | 2.96 | 1.20 | 0.78 | 1.71 | 0.66 | 0.00 | 0.68 |
| K2O | 0.29 | 0.00 | 0.00 | 0.00 | 0.70 | 3.88 | 1.62 | 2.54 | 1.90 | 1.52 | 1.06 | 0.90 | 0.19 |
| MgO | 5.91 | 0.60 | 0.02 | 1.76 | 2.06 | 0.41 | 7.82 | 3.69 | 3.29 | 5.39 | 3.60 | 2.40 | 4.23 |
| CaO | 6.33 | 7.79 | 3.37 | 7.61 | 7.98 | 2.27 | 5.87 | 3.92 | 3.84 | 4.82 | 4.10 | 3.60 | 4.51 |
| SrO | 0.00 | 0.14 | 0.05 | 0.13 | 0.14 | 5.45 | 2.29 | 3.80 | 3.39 | 2.69 | 2.69 | 2.80 | 1.91 |
| BaO | 0.00 | 4.64 | 1.92 | 4.53 | 4.93 | 3.34 | 1.35 | 2.78 | 3.59 | 2.79 | 4.19 | 5.00 | 4.65 |
| Nb2O5 | 0.30 | 0.00 | 0.49 | 0.00 | 0.00 | 0.86 | 0.42 | 0.59 | 0.44 | 0.37 | 0.25 | 0.20 | 0.06 |
| SnO2 | 0.30 | 0.30 | 0.30 | 0.30 | 0.30 | 0.00 | 0.00 | 0.00 | 0.00 | 0.00 | 0.00 | 0.00 | 0.00 |
| B2O3 | 0.78 | 0.00 | 0.00 | 0.00 | 0.00 | 0.00 | 0.00 | 0.00 | 0.00 | 0.00 | 0.00 | 0.00 | 0.00 |
| ZrO2 | 0.62 | 2.08 | 0.49 | 2.08 | 2.28 | 1.32 | 1.82 | 1.74 | 2.16 | 2.15 | 2.61 | 2.84 | 3.05 |
| MoO3 | 1.25 | 0.00 | 0.00 | 0.00 | 0.00 | 0.00 | 0.00 | 0.00 | 0.00 | 0.00 | 0.00 | 0.00 | 0.00 |
| Alk2O | 4.64 | 1.05 | 4.33 | 0.38 | 1.38 | 4.98 | 6.72 | 6.02 | 6.51 | 6.82 | 7.17 | 7.29 | 7.84 |
| REmOn | 1.86 | 6.01 | 6.86 | 5.75 | 6.36 | 7.29 | 8.24 | 7.86 | 8.16 | 8.31 | 8.53 | 8.61 | 8.92 |
| MgO + CaO | 12.25 | 8.39 | 3.40 | 9.37 | 10.04 | 2.68 | 13.69 | 7.61 | 7.13 | 10.21 | 7.70 | 6.00 | 8.74 |
| MgO + CaO + SrO + BaO | 8.02 | 12.69 | 5.28 | 13.06 | 13.78 | 13.69 | 13.36 | 13.88 | 14.58 | 14.27 | 15.25 | 15.76 | 15.87 |

TABLE 1A-continued

Compositions of exemplary glasses in mol %

| Mole % by batch | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| MgO + CaO + SrO + BaO + ZnO | 31.61 | 30.52 | 25.27 | 31.85 | 32.83 | 24.96 | 28.21 | 25.58 | 23.53 | 25.08 | 21.83 | 20.01 | 20.44 |
| Al2O3 − 1.5REmOn − Alk2O | −2.78 | 2.58 | −3.99 | 3.21 | 1.28 | −14.92 | −18.24 | −16.88 | −17.79 | −18.38 | −19.01 | −19.21 | −20.26 |

TABLE 1B

Compositions of exemplary glasses in weight %

| Weight % by batch | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| SiO2 | 35.46 | 20.45 | 20.88 | 21.10 | 19.15 | 29.64 | 30.98 | 30.06 | 29.68 | 30.16 | 29.44 | 29.02 | 29.26 |
| TiO2 | 11.16 | 13.27 | 16.70 | 12.98 | 12.34 | 13.97 | 11.47 | 13.48 | 14.84 | 13.75 | 15.98 | 17.20 | 16.92 |
| Al2O3 | 6.41 | 13.79 | 11.69 | 13.50 | 13.17 | 1.14 | 1.05 | 1.11 | 1.14 | 1.11 | 1.15 | 1.19 | 1.17 |
| La2O3 | 8.14 | 20.81 | 23.95 | 20.18 | 21.81 | 6.32 | 1.40 | 3.73 | 2.85 | 1.79 | 1.50 | 1.52 | 0.00 |
| Y2O3 | 0.00 | 0.00 | 0.00 | 0.00 | 0.00 | 14.05 | 21.83 | 18.11 | 19.49 | 21.16 | 21.59 | 21.53 | 23.94 |
| CeO2 | 0.03 | 0.07 | 0.08 | 0.06 | 0.07 | 0.02 | 0.02 | 0.02 | 0.02 | 0.02 | 0.02 | 0.02 | 0.02 |
| ZnO | 21.30 | 15.08 | 17.46 | 15.71 | 15.29 | 12.31 | 10.86 | 10.82 | 8.94 | 9.14 | 6.94 | 5.88 | 4.98 |
| Li2O | 0.39 | 0.07 | 1.37 | 0.10 | 0.19 | 0.37 | 0.78 | 0.80 | 1.34 | 1.28 | 1.92 | 2.22 | 2.48 |
| Na2O | 2.83 | 0.55 | 0.05 | 0.05 | 0.05 | 0.00 | 2.25 | 0.87 | 0.56 | 1.27 | 0.48 | 0.00 | 0.50 |
| K2O | 0.37 | 0.00 | 0.00 | 0.00 | 0.70 | 4.10 | 1.87 | 2.79 | 2.09 | 1.71 | 1.17 | 0.99 | 0.21 |
| MgO | 3.22 | 0.26 | 0.01 | 0.77 | 0.88 | 0.19 | 3.87 | 1.74 | 1.55 | 2.60 | 1.71 | 1.13 | 2.03 |
| CaO | 4.80 | 4.67 | 2.04 | 4.62 | 4.74 | 1.43 | 4.04 | 2.57 | 2.51 | 3.23 | 2.70 | 2.35 | 3.01 |
| SrO | 0.00 | 0.16 | 0.06 | 0.15 | 0.15 | 6.33 | 2.91 | 4.60 | 4.10 | 3.33 | 3.28 | 3.37 | 2.36 |
| BaO | 0.00 | 7.60 | 3.17 | 7.52 | 8.00 | 5.74 | 2.54 | 4.98 | 6.42 | 5.11 | 7.56 | 8.91 | 8.48 |
| Nb2O5 | 1.08 | 0.00 | 1.40 | 0.00 | 0.00 | 2.56 | 1.37 | 1.83 | 1.36 | 1.18 | 0.78 | 0.62 | 0.19 |
| SnO2 | 0.61 | 0.48 | 0.49 | 0.49 | 0.48 | 0.00 | 0.00 | 0.00 | 0.00 | 0.00 | 0.00 | 0.00 | 0.00 |
| B2O3 | 0.73 | 0.00 | 0.00 | 0.00 | 0.00 | 0.00 | 0.00 | 0.00 | 0.00 | 0.00 | 0.00 | 0.00 | 0.00 |
| ZrO2 | 1.03 | 2.74 | 0.65 | 2.77 | 2.97 | 1.82 | 2.75 | 2.50 | 3.11 | 3.17 | 3.78 | 4.07 | 4.47 |
| MoO3 | 2.43 | 0.00 | 0.00 | 0.00 | 0.00 | 0.00 | 0.00 | 0.00 | 0.00 | 0.00 | 0.00 | 0.00 | 0.00 |
| Alk2O | 3.59 | 0.62 | 1.42 | 0.15 | 0.94 | 4.47 | 4.91 | 4.46 | 3.99 | 4.26 | 3.57 | 3.21 | 3.19 |
| REmOn | 8.17 | 20.88 | 24.03 | 20.24 | 21.88 | 20.39 | 23.25 | 21.86 | 22.36 | 22.97 | 23.11 | 23.07 | 23.96 |
| MgO + CaO | 8.02 | 4.93 | 2.05 | 5.39 | 5.62 | 1.61 | 7.91 | 4.30 | 4.06 | 5.83 | 4.41 | 3.47 | 5.04 |
| MgO + CaO + SrO + BaO + ZnO | 29.32 | 27.77 | 22.74 | 28.77 | 29.07 | 26.00 | 24.22 | 24.70 | 23.52 | 23.41 | 22.19 | 21.64 | 20.85 |

40

TABLE 2

Properties of exemplary glasses*

| Property | Ex. 1 | Ex. 2 | Ex. 3 | Ex. 4 | Ex. 5 | Ex. 6 | Ex. 7 | Ex. 8 |
|---|---|---|---|---|---|---|---|---|
| Density d (g/cm3) | 3.218 | 3.818 | 3.872 | 3.826 | 3.878 | [3.6] | [3.6] | [3.6] |
| Refractive index nd | 1.667 | 1.785 | 1.81< nd <1.83 | 1.793 | 1.795 | 1.765 | 1.745 | 1.750 |
| Tg, ° C. | 622 | 691 | 638 | 690 | 685 | [600] | [580] | [620] |
| Tx, ° C. | 783 | 822 | 756 | 821 | 815 | | | |
| CTE 20-300 | [72] | 61.8 | [64] | 59.8 | 67.4 | [83] | [75] | [75] |
| CTE 0-100 | [66] | 57.2 | [60] | 53.4 | 61.8 | | | |
| Annealing point (° C.) | [670] | 686 | [625] | 687 | [690] | [600] | [580] | [620] |
| Strain point (° C.) | [630] | 648 | [580] | 650 | [650] | | | |
| Liquidus temperature (° C.) | | 1410 | | 1410 | | | | |
| Young's modulus E (GPa) | 99 | 118 | 118 | 117 | 114 | [95] | [110] | [100] |
| Poisson's ratio n | 0.268 | 0.291 | 0.289 | 0.294 | 0.294 | [0.27] | [0.27] | [0.27] |
| (n − 1)/d | 0.207 | 0.206 | 0.211 | 0.207 | 0.205 | [0.2] | [0.2] | [0.2] |
| Spec. modulus | 30.8 | 30.9 | 30.5 | 30.6 | 29.4 | [26] | [30] | [28] |
| alfaE/(1 − nu) | [1.0] | 1.03 | [1.1] | 0.99 | 1.09 | [1.1] | [1.1] | [1.0] |
| Tx − Tg | 161 | 131 | 118 | 131 | 130 | | | |

TABLE 2-continued

Properties of exemplary glasses*

| Property | Ex. 9 | Ex. 10 | Ex. 11 | Ex. 12 | Ex. 13 |
|---|---|---|---|---|---|
| Density d (g/cm3) | [3.6] | [3.6] | [3.6] | [3.6] | [3.6] |
| Refractive index nd | 1.770 | 1.765 | 1.785 | 1.800 | 1.795 |
| Tg, ° C. | [600] | [600] | [600] | [560] | [600] |
| Tx, ° C. | | | | | |
| CTE 20-300 | [75] | [78] | [78] | [80] | 78] |
| CTE 0-100 | | | | | |
| Annealing point (° C.) | [600] | [600] | [600] | [560] | [600] |
| Strain point (° C.) | | | | | |
| Liquidus temperature (° C.) | | | | | |
| Young's modulus E (GPa) | [110] | [110] | [110] | [110] | [120] |
| Poisson's ratio n | [0.27] | [0.27] | [0.27] | [0.27] | [0.27] |
| (n − 1)/d | [0.2] | [0.2] | [0.2] | [0.2] | [0.2] |
| Spec, modulus | [30] | [30] | [30] | [30] | [33] |
| alfaE/(1 − nu) | [1.1] | [1.2] | [1.2] | [1.2] | [1.3] |
| Tx − Tg | | | | | |

*Values [in brackets] are estimates calculated from glass compositions. Other values are measured.

The glasses embodiments of Tables 1 and 2 exhibit high refractive indices, comparatively low densities, rather low coefficients of thermal expansion and high elastic moduli.

These glasses advantageously have light weight and durability to cracking after loading or mechanical damage. They have high optical transmittance in required wavelength ranges, for example, in the visible range, or the part of the visible range. Additionally, many of these glasses are suitable for use in substrates for information recording media because they exhibit a high elastic modulus.

The refractive index determines the thickness of a glass article, e.g. lens, sufficient for its functioning. The most frequently used characteristic of the refractive index is $n_d$, i.e. the refractive index measured for the wavelength of approximately 589.3 nm, corresponding to the yellow d-line of sodium spectrum. Therefore, the higher the refractive index, the more compact the optical system of same performance can be. For high-index glasses, it is preferable to have the value of $n_d$ equal to 1.70-1.80 or higher. The glasses described herein can advantageously provide such high refractive indices.

For many optical systems, such as consumer glasses, smartphone cameras, etc., it is important to have not only small size but light weight as well. The weight of an article of a given geometrical size and shape is determined by density d. For high-index glasses, it is preferable to have a density value of about 3.5-4.0 g/cm³ or less. The glasses described herein can advantageously have a density value of about 3.5-4.0 g/cm³ or less.

A generalized numerical measure of optical performance considering both high refractive index and light weight can be approximately evaluated in terms of the ratio $(n_d-1)/d$. This ratio is often mentioned as "refraction". The higher the ratio $(n_d-1)/d$, the lighter the lens of same optical performance is. For high-index glasses it is advantageous to have numerical value of $(n_d-1)/d$ of at least about 0.2. At least some of the glass embodiments described herein have of at least about 0.2. For example, in the glass embodiments described herein 0.2 cm³/g≤$(N_d-1)/d$≤0.25 cm³/g.

One more requirement of information recording media is high elastic modulus, i.e., the ratio of the force exerted upon a substance or body to the resultant deformation. High elastic modulus makes a glass article more rigid and allows it to avoid large deformations under an external force that may take place when recording or reading information.

There are several numerical characteristics of elasticity. The most common characterization for a material stiffness is the Young's modulus E, i.e. the relationship between stress (force per unit area) and strain (proportional deformation) in an article made of this material. The greater the Young's modulus of a material, the less is the deformation of the article. For the substrates of information recording media, it is desirable to have a Young's modulus of about 100 GPa or higher. The glass embodiments described herein advantageously have Young's modulus that is ≥100 GPa.

For optical elements, high stiffness of a material causes a stable optical image under some external (especially, variable) force, which is important for some optical systems. However, high value of the Young's modulus often conflicts with the technological requirement of low thermal stress formed in an article during production (see below), which makes it desirable to have the stiffness low enough. Accordingly, for high-index glasses it is preferable to have the Young's modulus not very high, like 100 GPa or less. For a glass composition that may be used for both applications, the preferable value of the Young's modulus is around 100 GPa.

To characterize glasses that have high Young's modulus and light weight, it is convenient to use the specific modulus E/d, which is the ratio of the Young's modulus E to the glass density d. In some exemplary embodiments, the specific modulus of the glass is 30 GPa·cm³/gram≤(E/d) 40 GPa·cm³/gram. In some exemplary embodiments, the specific modulus of the glass is 32 GPa·cm³/gram≤(E/d) 38 GPa·cm³/gram. In some exemplary embodiments, the specific modulus of the glass is 30-34 GPa*cm³/gram. In some exemplary embodiments, the specific modulus of the glass is 32-34 GPa*cm³/gram. In some exemplary embodiments, the specific modulus of the glass is 32-40 GPa*cm³/gram. For the glass substrates for information recording media, the values of E/d are preferably equal to at least about 30 GPa·cm³/gram, for example at least 32 GPa·cm³/gram, or at least 30 GPa·cm³/gram, or 34 GPa·cm³/gram.

From a technological viewpoint, it is necessary for optical glasses to avoid excessive stresses that can be formed in a glass article during production. These stresses appear when cooling a glass article after being formed. The value of formed stresses depends on multiple factors, such as size and shape of the article and cooling rate in the sensitive temperature range (roughly, the interval between the annealing and strain points of a glass). All other factors being equal, the value of stress depends on glass composition. This quantity is evaluated as the ratio R=E·α/(1−ν), where E represents Young's modulus, α is the mean coefficient of linear thermal expansion and ν is Poisson's ratio; all characteristics are measured at temperatures below the glass transition temperature $T_g$ (the first two of them at room temperature). Accordingly, all other factors being equal, the lower the ratio E·α/(1−ν), the less the values of stress in the glass. There are also some other, more complicated indicators that consider structural relaxation, but all of them consider, in some way or other, the values of thermal expansion coefficient (α) and one of elastic moduli, mostly, the E value. In terms of the ratio R=E·α/(1−ν), optical glasses described herein preferably E·α/(1−ν) ratio of 1.0 MPa·K$^{-1}$ or less.

Accordingly, the glasses should have rather low coefficients of thermal expansion (below, we will use the abbreviation α).

For optical elements, as stated above, the value of α contributes to thermal stress that may be formed when cooling an article after hot pressing or other forming procedure, which can be considered in terms of the ratio E·α/(1−ν), which preferable values are 1.2 MPa·K$^{-1}$ or less, for example 1.1 MPa·K$^{-1}$ or less, or 1.0 MPa·K$^{-1}$ or less. For example, in some embodiments the ratio E·α/(1−ν) is 0.3 MPa·K$^{-1}$≤E·α/(1−ν)≤1.0 MPa·K$^{-1}$, or
0.35 MPa·K$^{-1}$≤E·α/(1−ν)≤1.0 MPa·K$^{-1}$, or 0.4 MPa·K$^{-1}$≤E·α/(1−ν)≤1.0 MPa·K$^{-1}$.

Considering that the optimal value of Young's modulus for the described multi-purpose glasses is around 100 GPa (see above) and a typical value of Poisson's ratio for glasses equal to ν≈0.25, the preferable value of α for these optical glasses is 60·10$^{-7}$ K$^{-1}$ to 80·10$^{-7}$ K$^{-1}$, or 60·10$^{-7}$ K$^{-1}$ to 75·10$^{-7}$ K$^{-1}$, more preferably not greater than 72·10$^{-7}$ K$^{-1}$, more preferably not greater than 70·10$^{-7}$ K$^{-1}$, for example 60·10$^{-7}$ K$^{-1}$ to 70·10$^{-7}$ K$^{-1}$, e.g., α≈62·10$^{-7}$ K$^{-1}$, α≈65·10$^{-7}$ K$^{-1}$, α≈67·10$^{-7}$ K$^{-1}$, α≈69·10$^{-7}$ K$^{-1}$.

For glass substrates for information recording media, the value of α determines the possible changes of the linear size of the substrate caused by temperature changes resulting from recording information and/or the changes of the outside temperature. The less the value of α, the less the temperature-induced deformation is. The requirements on α of the substrates for information recording media are similar to the previous case: it is desired to have the value of α be about (60 to 70)×10$^{-7}$ K$^{-1}$ or less.

From a technological viewpoint, as stated above, it is important for these glasses to have the minimum level of the viscosity at liquidus temperature (below, liquidus viscosity) that minimizes susceptibility of glass melt to crystallization during formation of the articles. For example, for optical elements that are formed by hot-pressing or similar methods, the minimum acceptable liquidus viscosity (depending on the article size and equipment) can be several poise and higher. According to the embodiments disclosed herein, the glasses for substrates the information recording media advantageously have liquidus viscosity of about 100 poise and higher.

Another requirement is the glass transition temperature ($T_g$) that approximately characterizes some middle temperature in the range in which a glass article becomes mechanically solid when cooling, or starts to soften when heating. Roughly, $T_g$ corresponds to the temperature at which viscosity is equal to 10$^{13}$ pose; the exact value depends on glass composition, heating/cooling rates and other factors. If $T_g$ is too low, a glass article may not be able to sustain heat treatments that often take place when manufacturing and/or using glass articles. If $T_g$ is too high, a glass composition may not be compatible with conventional equipment used in production. Therefore, it is preferable to have an intermediate glass transition temperature (e.g. Tg<700° C.). According to at least some embodiments described herein 590° C.≤Tg≤700° C., or 590° C.≤Tg≤650 0° C., or 590° C.≤Tg≤625° C.

Another technological requirement concerns the melting temperature, i.e. the minimum temperature at which the glasses can be melted and refined from the residual gases (coming from the raw materials) during a reasonable time. For most industrial glasses, the melting temperature is the temperature at which a glass melt has a viscosity equal to approximately 100-300 Pose. The temperature corresponding to the viscosity of 200 Pose (below, we will use the term "200P temperature") can be considered as an estimate of the melting temperature. The lower is melting temperature, the lower is the energy consumption for glass melting. Also, at lower temperatures the process of glass production is more compatible with conventional refractories, and raising the temperature may cause corrosion of the refractory elements in the furnace. Therefore, the lower is the 200P temperature, the more advantageous a given glass composition is (all other factors being equal) in terms of glass melting. Many of the glass embodiments disclosed herein have melting temperature below 1400° C., or below 1375° C., or even at or below 1350° C.

All compositional components, relationships, and ratios described in this specification are provided in mol %, unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:
1. A glass composition comprising:
(a) greater than or equal to 10.0 mol % and less than or equal to 15.0 mol % Al$_2$O$_3$, greater than or equal to 15.0 mol % and less than or equal to 20.0 mol % ZnO, and greater than or equal to 30.0 mol % and less than or equal to 35.0 mol % SiO$_2$;
(b) TiO$_2$, in the amount of greater than or equal to 12.0 mol % and less than or equal to 20 mol %;
(c) alkaline metal oxide selected from the group consisting of MgO, CaO, SrO, BaO, or any combination thereof,
such that the molar sum of MgO, CaO, SrO, BaO, and ZnO, in the amount in the glass composition is least 20 mol % and not greater than 35 mol %, and such that the molar sum of alkaline metal oxides (MgO+CaO+SrO+BaO) is greater than or equal to 5.0 mol % and less than or equal to 15.0 mol %, and such that:
(i) the amount of BaO is 0 to 10 mol %;
(ii) the amount of MgO is 0 to 10 mol %
(iii) the amount of CaO is 0 to 10 mol %, and the molar sum of CaO and MgO in the glass composition is less than 12.5 mol %;

(d) rare earth metal oxides ($\Sigma RE_m O_n$), in the amount of greater than or equal to 5.0 mol % and less than or equal to 10 mol %;
(e) alkali metal oxides ($\Sigma Alk_2 O$), in the amount of greater than or equal to 0 mol % and less than or equal to 5 mol %; and
(f) not greater than 5 mol % of other components; and wherein
(g) $-5$ mol % $\leq Al_2O_3$ (mol %)$-1.5$ $\Sigma RE_m O_n$ (mol %)$-\Sigma Alk_2 O$ (mol %)$\leq +5$ mol %.

2. The glass composition of claim 1, wherein the glass composition comprises greater than or equal to 30 mol % and less than or equal to 45 mol % $SiO_2$.

3. The glass composition of claim 1, wherein the glass composition comprises greater than or equal to 15 mol % ZnO.

4. The glass composition of claim 1, wherein the glass composition comprises less than or equal to 15 mol % $Al_2O_3$.

5. The glass composition of claim 1, wherein the glass composition has a refractive index $n_d$ such as $1.66 \leq n_d \leq 1.83$.

6. The glass composition of claim 1, wherein the glass composition has a linear thermal expansion coefficient in the range 20-300° C., $\alpha_{20\text{-}300}$, that is greater than or equal to $60 \times 10^{-7}$ $K^{-1}$ and less than or equal to $70 \times 10^{-7}$ $K^{-1}$.

7. The glass composition of claim 1, wherein the glass composition has a linear thermal expansion coefficient in the range 20-100° C., $\alpha_{20\text{-}100}$ of greater than or equal to about $50 \times 10^{-7}$ $K^{-1}$ and less than or equal to about $60 \times 10^{-7}$ $K^{-1}$.

8. The glass composition of claim 1, wherein the glass has a Young's modulus that is greater than or equal to about 95 GPa.

9. The glass composition of claim 1, wherein the glass has a Young's modulus that is less than or equal to about 120 GPa.

10. The glass composition of claim 1, wherein glass density d is: $3.2$ g/cm$^3 \leq d \leq 3.9$ g/cm$^3$.

11. The glass composition of claim 10, wherein glass density d is less than or equal to about 3.5 g/cm$^3$.

12. The glass composition of claim 1, wherein the glass has a liquidus temperature of less than or equal to about 1410° C.

13. The glass composition of claim 1, wherein the glass has a melting temperature $T_m$ that is less than or equal to 1410° C.

14. The glass composition of claim 1, wherein the glass has a glass transition temperature $T_g$ that is greater than or equal to than about 600° C. and less than or equal to about 700° C.

15. The glass composition of claim 1, wherein the glass has a crystallization onset temperature $T_x$, such that the difference $(T_x - T_g)$ is greater than or equal to about 130° C., where $T_g$ is the glass transition temperature.

16. The glass composition of claim 1, wherein the glass has a specific modulus greater than or equal to about 30 GPa*cm$^3$/gram.

17. The glass composition of claim 1, wherein the glass has a ratio $\alpha_{20\text{-}300} E/(1-v)$ less than or equal to about 1.0 MPa/° C., where $\alpha_{20\text{-}300}$ is a linear thermal expansion coefficient in the range 20-300° C., E is a Young's modulus, and v is a Poisson's ratio.

18. The glass composition of claim 1, wherein the glass has a ratio of $(n_d-1)/d$ that is greater than or equal to about 0.20 cm$^3$/g, wherein d is the glass density.

19. The glass composition of claim 1, wherein the glass composition has a refractive index $n_d$ such as $1.78 \leq n_d \leq 1.83$.

20. The glass composition of claim 1, wherein the glass composition has a linear thermal expansion coefficient in the range 20-300° C., $\alpha_{20\text{-}300}$, that less than or equal to about $60 \times 10^{-7}$ $K^{-1}$.

21. The glass composition of claim 1, wherein the glass composition has a refractive index $n_d$ greater than or equal to 1.75; and
a linear thermal expansion coefficient in the range 20-300° C., $\alpha_{20\text{-}300}$, that less than or equal to $65 \times 10^{-7}$ $K^{-1}$.

22. The glass composition according to claim 1, comprising at least 30.0 mol % $SiO_2$, said glass being free of iron, lead, antimony ant tantalum oxides, said glass having a refractive index $n_d$ greater than or equal to 1.75 and a linear thermal expansion coefficient in the range 20-300° C., $\alpha_{20\text{-}300}$, that is less than or equal to about $65 \times 10^{-7}$ $K^{-1}$.

23. The glass composition according to claim 1, comprising at least 30 to 35 mol % $SiO_2$, 10 to 15 mol % $Al_2O_3$, 15 to 20 mol % $TiO_2$, 15 to 20 mol % ZnO, and 5 to 10 mol % $La_2O_3$.

24. A zinc aluminosilicate glass comprising:
(a) greater than or equal to 10 weight % and less than or equal to 20 weight % $TiO_2$;
(b) greater than or equal to 20 weight % and less than or equal to 35 weight % (MgO+CaO+SrO+BaO+ZnO), including
a. from 0 to 5 weight % MgO,
b. from 0 to 5 weight % CaO,
c. from 0 to 10 weight % BaO,
d. sum of (CaO+MgO) being less than 10 weight %;
(c) greater than or equal to 8 weight % and less than or equal to 25 weight % rare earth metal oxides ($\Sigma RE_m O_n$);
(d) greater than or equal to 0 weight % and less than or equal to 5 weight % alkali metal oxides ($\Sigma Alk_2 O$);
(e) not more than 5 weight % of other species; and
(f) greater than or equal to 10.0 weight % and less than or equal to 15.0 weight % $Al_2O_3$.

25. A glass according to claim 24, wherein the glass composition comprises greater than or equal to 15 weight % $SiO_2$.

26. A glass according to claim 24, wherein the glass composition comprises greater than or equal to 15 weight % ZnO.

27. The glass according to claim 24, wherein the glass has the refractive index $n_d$ about 1.78-1.83; density less than or equal to about 3.9 g/cm$^3$; glass transition temperature $T_g$ of 600° C. to 700° C.; specific modulus of about 30-34 GPa*cm$^3$/gram; and liquidus temperature of less than or equal to 1410° C., and crystallization onset temperature $T_x$ greater than or equal to $(T_g+130)$ ° C.

28. A glass article comprising a zinc aluminosilicate glass, the glass comprising, on mole percent basis:
a) greater than or equal to 10 mol % and less than or equal to 20 mol % $TiO_2$;
b) greater than or equal to 20 mol % and less than or equal to 35 mol % (MgO+CaO+SrO+BaO+ZnO), including from 0 to 10 mol % MgO, from 0 to 10 mol % CaO, from 0 to 10 mol % BaO, sum of (CaO+MgO) being less than 12.5 mol %;
c) greater than or equal to 1.5 mol % and less than or equal to 10 mol % rare earth metal oxides ($\Sigma RE_m O_n$);
d) greater than or equal to 0 mol % and less than or equal to 5 mol % alkali metal oxides ($\Sigma Alk_2 O$); and
e) greater than or equal to 10.0 mol % and less than or equal to 15.0 mol % $Al_2O_3$, f) wherein the following is satisfied: $-5 \text{ mol \%} \leq (\text{Al2O3 [mol \%]} - 1.5 \, \Sigma \text{RE}_m\text{O}_n \text{ [mol \%]} - \Sigma \text{Alk}_2\text{O[mol \%]}) \leq +5 \text{ mol \%}$.

\* \* \* \* \*

UNITED STATES PATENT AND TRADEMARK OFFICE
CERTIFICATE OF CORRECTION

| | |
|---|---|
| PATENT NO. | : 11,407,673 B2 |
| APPLICATION NO. | : 16/682482 |
| DATED | : August 9, 2022 |
| INVENTOR(S) | : Jian Luo et al. |

It is certified that error appears in the above-identified patent and that said Letters Patent is hereby corrected as shown below:

In the Specification

In Column 1, Line 10, delete "entirety" and insert -- entirety. --.

In the Claims

In Column 22, Line 64, in Claim 1, delete "mol %" and insert -- mol %; --.

In Column 23, Line 49, in Claim 14, delete "equal to than" and insert -- equal to --.

In Column 23, Line 59, in Claim 17, delete "$\alpha_{20\text{-}300}E/(1-v)$" and insert -- $\alpha_{20\text{-}300}\ E/(1-v)$ --.

Signed and Sealed this
First Day of November, 2022

Katherine Kelly Vidal
*Director of the United States Patent and Trademark Office*